March 22, 1932. W. A. FAIT 1,850,711
AEROPLANE LIFTING AND DRIVING DEVICE
Filed Jan. 29, 1931 2 Sheets-Sheet 1
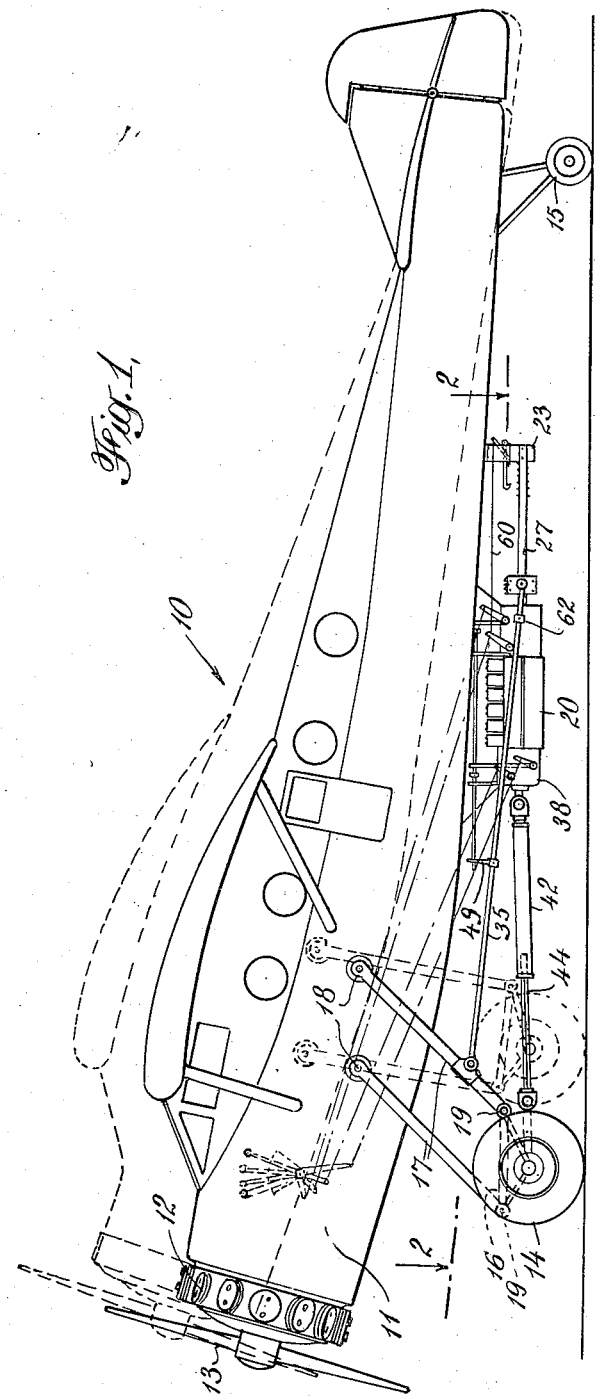
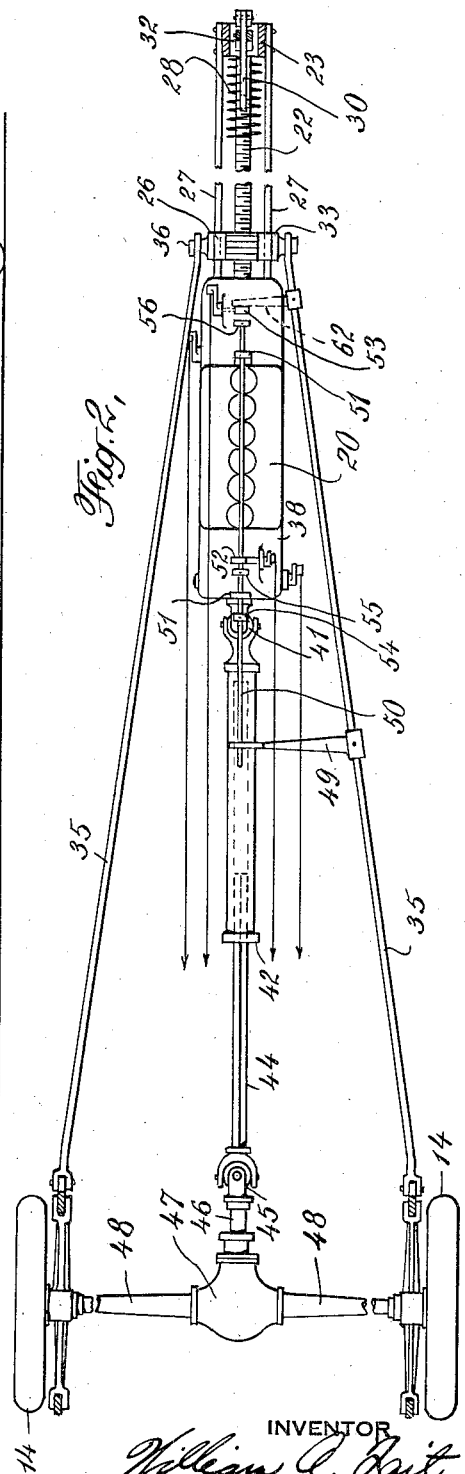
INVENTOR
William A. Fait
BY
Pennie, Davis, Marvin & Edmonds
ATTORNEYS March 22, 1932.  W. A. FAIT  1,850,711
AEROPLANE LIFTING AND DRIVING DEVICE
Filed Jan. 29, 1931  2 Sheets-Sheet 2
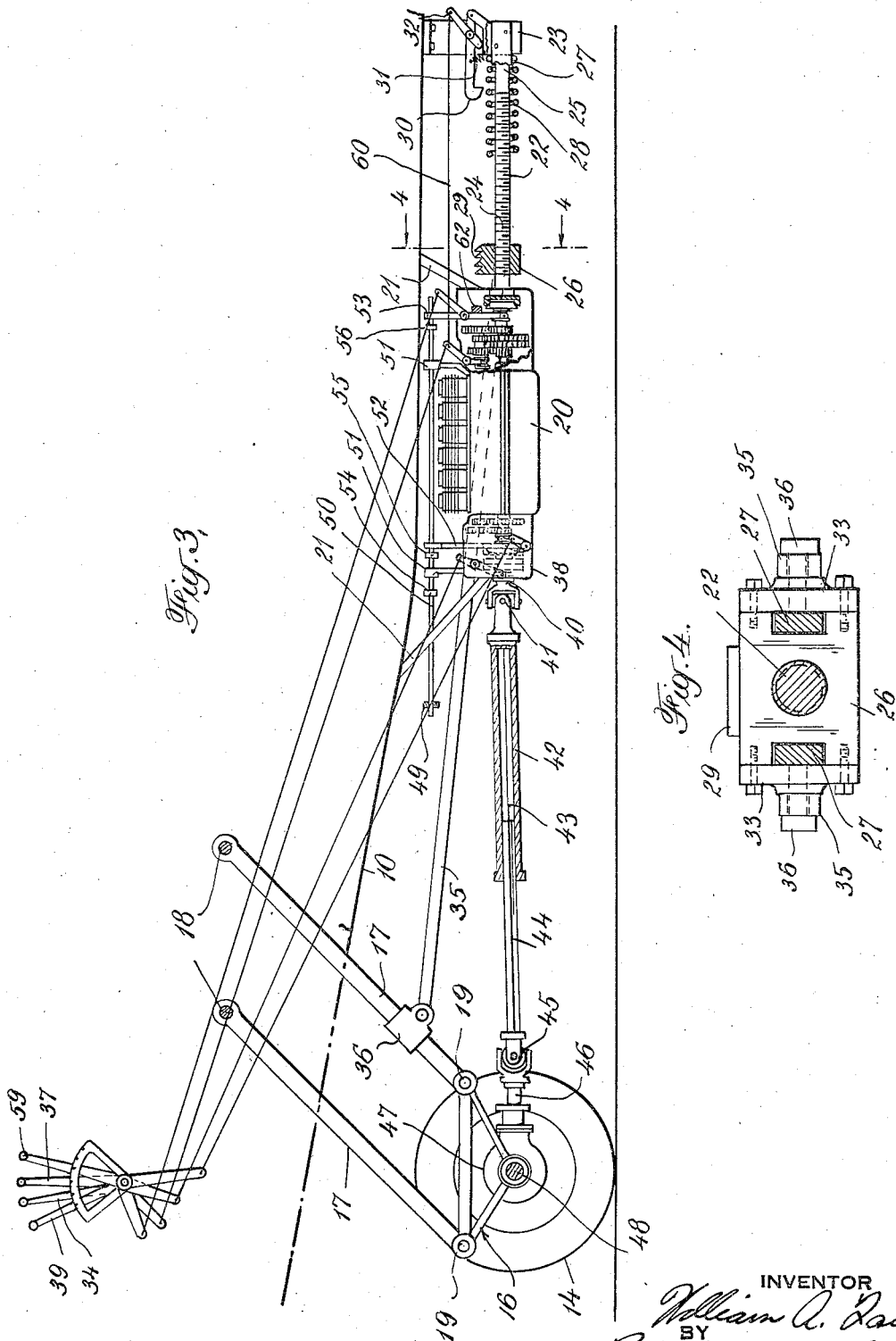

Patented Mar. 22, 1932

1,850,711

UNITED STATES PATENT OFFICE

WILLIAM A. FAIT, OF NEW YORK, N. Y., ASSIGNOR OF ONE-HALF TO JACOB BRANDT, OF NEW YORK, N. Y.

AEROPLANE LIFTING AND DRIVING DEVICE

Application filed January 29, 1931. Serial No. 512,090.

This invention relates to a driving and lifting device for aeroplanes, and has particular reference to an auxiliary power means especially adapted for facilitating the launching of an aeroplane by driving it along the ground and lifting it when taking off from the ground.

The inertia and rolling resistance of an aeroplane, especially large and heavily loaded craft, is considerable and they must be driven relatively long distances over the ground by their propellers before they attain sufficient speed for taking off into the air. Furthermore, such craft frequently skip along the ground when taking off, because the lifting force is insufficient to permit the craft to completely clear the ground at once, with the consequent liability of damage to the landing gear and considerable shock to the craft.

It is accordingly desirable to impart sufficient ground speed to an aeroplane to enable it to take off within a relatively short space, and also to cause it to rise at once when flying speed is attained without bouncing along the ground. Both of these advantages are obtained with the device of this invention, which serves as an auxiliary power means and in no way detracts from or interferes with the normal operation of the craft in the air, as it becomes inoperative after the aeroplane is launched into the air.

The new device of this invention comprises an auxiliary source of power, such as a separate motor having no connection with the propeller motors, and connected to the undercarriage for driving the traction wheels thereof, and for extending the undercarriage or portions thereof in a vertical direction to elevate the lifting surfaces of the craft at the appropriate time when taking off, so that it clears the ground at once. This auxiliary motor is preferably suspended from or mounted upon the underside of the fuselage of the craft, and is controllable from the cock-pit. Driving connections extend from the motor through suitable speed reduction and differential gearing to at least two of the traction wheels of the craft for driving the same. These traction wheels, or other wheels or ground engaging means at the front end of the craft, are arranged to move downwardly away from the craft, so as to lift the craft relatively to the ground, and this movement is preferably also produced by suitable driving connections to the auxiliary motor.

In a preferred arrangement the traction wheels at the front of the craft are journalled on arms or struts pivoted to the craft for swinging movement fore and aft, their normal position being such that the traction wheels lie adjacent the craft, i. e. not at the outermost or lowest position permitted by their pivotal support. Accordingly, movement of these traction wheels about their pivots from the aforementioned normal position to the outermost or lowest position results in the elevation of the nose of the craft above the ground. This action, procured by the pilot or other operator at the appropriate time by controlling the driving connections between the auxiliary motor and the lifting mechanism described, results in an artificial lift of the nose of the craft when taking off, which lift augments the normal rise of the craft procured by the propeller, ailerons, elevators, and other lifting surfaces of the craft. This enables the craft to take off at once when sufficient ground speed is attained, without skipping along the ground or engaging low obstructions ahead. Although this lifting mechanism forms part of the undercarriage or landing gear and remains in extended position when the craft again lands, it in no wise interferes with the landing.

It will be seen that the new invention described provides a very simple and effective means under the control of the pilot or other operator to facilitate the taking off of aircraft by overcoming the inertia and ground resistance of the craft and increasing its lift, whereby the craft may take off in a much shorter space without danger and with greater ease. Further details of the invention are illustrated in the accompanying drawings, in which Figure 1 is an elevation of an aeroplane equipped with the auxiliary drive and lift mechanism of this invention;

Figure 2 is a plan view of the new mechanism as seen along the line 2—2 of Figure 1;

Figure 3 is an enlarged elevation thereof, showing details of the operating mechanism; and Figure 4 is an enlarged section of the undercarriage extending mechanism as seen along the line 4—4 of Figure 3.

Referring to these drawings numeral 10 designates an aeroplane or other air craft having the fuselage 11 or equivalent frame or gondola, one or more motors 12 for driving the propeller or propellers 13, and front wheels 14 for at least partially supporting the weight of the plane and a rear wheel 15 or its equivalent skid, or the like, for supporting the tail of the craft. Though an aeroplane is illustrated and the invention will be described in connection with it, it is to be understood that the invention is not limited to use on an aeroplane but may be used on other flying craft, whether heavier or lighter than air, or whether adapted to land on the ground or other landing surface or upon the water.

Instead of mounting the front wheels 14 rigidly upon the fuselage 12 or other portion of the frame of the craft 10 together with the usual shock absorbing provisions, the wheels 14 in the arrangement of this invention are mounted upon a frame which may constitute the undercarriage or landing gear or form portions thereof, and which is extensible and contractible in substantially a vertical direction relatively to the body of the craft. Numerous ways of procuring this extension and contraction of the undercarriage may be employed and one of these arrangements is illustrated in the drawings and will be described as an example of the mode of execution of the invention. In this arrangement, the wheels are journalled on a wheel frame generally designated by numeral 16 and which is connected to the fuselage 11 or other support of the craft 10 by a pantograph mechanism consisting of two pendulous arms 17, suspended in spaced relation to pivots 18 secured to the fuselage 11 or other support on the frame of the craft and pivoted at their other ends at 19 in spaced relation on the wheel frame 16. It will be seen that this pantograph support for the wheels 14 permits them to be swung bodily fore and aft, while maintaining a firm connection with the craft for at least partially supporting the same, and whereby no sliding or loose joints are employed.

The normal position of the wheels when the craft is upon the ground or other surface is such that the wheels lie adjacent the fuselage 11 or other portion of the craft 10 so that when they are swung from fore to aft, or vice versa, they reach a lower position than this normal position, that is to say, they are spaced further from the fuselage 11 or other portions of the frame than when they lie in a normal position. Thus it will be seen that when the pantograph support of the wheels 14 is swung forwardly into the position shown in Figures 1 and 3, the craft lies relatively close to the ground, and when the pantograph support is swung to the lowermost position shown in phantom in Figure 1, it acts as a jack for not only raising the craft 10 but also for projecting it forwardly a certain distance.

The preferred mechanism for procuring the aforementioned elevation and forward projection of the craft relatively to the ground by means of this extensible undercarriage or landing gear described, includes an auxiliary motor 20 suitably supported on brackets 21 from the lower surface of the fuselage 11 or other support or frame of the craft. This motor 20 may be of the conventional internal combustion type and is preferably a six-cylinder air-cooled engine, having in general the same characteristics as air craft driving engines and developing sufficient horse power to perform its functions. It will be seen that the motor 20 lies in the air stream of the propeller 13 when the craft is standing on the ground and the motor 12 is operating, and that the motor also lies in the air stream induced by forward motion of the craft when it moves along the ground or in the air, although, when the craft is in the air, motor 20 is not, in general, operating. A stream-lined housing, not shown, is preferably employed for enclosing the motor 20, this housing having louvres, or the like, for permitting passage of the stream of cooling air around the motor 20 in accordance with the usual practice.

The frame of the motor 20 is provided, at one end, preferably at its rear end, with a housing 21 for enclosing speed reduction gears, including a reverse gear, and a clutch and as this gearing and the clutch may be of conventional design they are not illustrated in detail and need not be further described. Driven through this gearing and the clutch is an elongated shaft 22 journalled at its free end in a bracket 23 suitably supported beneath the fuselage. The greater length of this shaft 22 is provided with threads 24 of medium pitch, but of considerable dimension to provide strength. The rear end 25 of the shaft 22 is not provided with threads and is of a diameter substantially equivalent to the bottom diameter of the threads on screw 24.

Threaded on the screw 24 is a cross-head 26, shown in an enlarged cross-section in Figure 4. This cross-head 26 is supported upon and guided by rails or guides 27 secured at one end on the frame of engine 20 and at the other end on bracket 23. These rails 28 permit the cross-head 26 to slide freely backwardly and forwardly when driven by screw 24, and also prevent the cross-head 26 from rotating with the screw. Extending between bracket 23 to a point substantially mid-way the length of screw 24, is a coil spring 28 which is adapted to engage the rear surface of the cross-head 26 before it reaches the end of the screw 24, whereby the spring 28 acts as a buffer for the cross-head 26 as it approaches the end of its movement along screw 24. The upper surface of cross-head 26 is preferably provided with a series of ratchet teeth 29 adapted to be engaged by the pawl 30, pivoted upon the upper and lower surfaces of bracket 23 and normally pressed inwardly by a suitable spring 31. This pawl 20 is also provided with a lever 52 so that it may be released from the corresponding teeth on cross-head 26 for a purpose to be described later.

Secured to the opposite sides of cross-head 26 are brackets 33, to which are pivoted the rear ends of draw-bars 35 by pins 36, or the like. The forward ends of these draw-bars 35 are pivoted to brackets 36 mounted on the pantograph arms 17, as illustrated especially in Figures 1 and 3.

It will be seen that in order to operate this lifting and projecting mechanism the pilot or other operator in the cock-pit of the craft 10 need only start the auxiliary motor 20 in the usual way, engage the clutch in housing 21 by means of a lever 37 and the consequent rotation of screw 24 drives cross-head 26 rearwardly to pull the pantograph frame 16—17 and the wheels 14 rearwardly by means of the draw-bars 35, so that the pantograph support moves about its pivots 18 downwardly and rearwardly to lift the craft 10 and also to project it forwardly, as illustrated in Figure 1.

The auxiliary motor 20 is arranged for another important use, involving the driving of wheels 14, which thus become traction wheels. The front end of the frame of motor 20 is, accordingly, provided with a housing 38, containing a conventional speed reduction gearing and also a clutch, the clutch being operated by means of a lever 39 in the cock-pit of the craft 10. A brake, operable by lever 34, may also be provided in housing 38 if desired. Connected through the gearing and clutch to the crank-shaft of the auxiliary motor 20, is a stub shaft 40 connected through a universal joint 41 with a propeller shaft 42, having a socket 43 in its outer end, in which is splined the shaft 44, so as to rotate therewith. The shaft 44 is connected at its forward end through a universal joint 45 to a drive shaft 46, extending into the banjo housing 47 of a conventional form of differential gearing, such as is employed in automobiles and which is connected by shafts within axle housings 48 to the wheels 14.

It will be seen that with this arrangement, the auxiliary motor 20 also drives the wheels 14 to drive the craft 10 along the ground or other surface independently of the drive procured by the air thrust of propeller 13. As these wheels 14 are retracted by draw-bars 35 in the manner described, the necessary foreshortening of propeller shaft 42—44 is compensated for by the splined connection between the two parts 42—44 of this propeller shaft.

Automatic disconnection of the auxiliary motor 20 from the screw 24 and the propeller shaft 42—44 is an advantage which is procured by apparatus operated in conjunction with the lifting mechanism, and which preferably includes an arm 49 secured to one of the draw-bars 35 and extending inwardly and provided with an eye at its free end in which a shifter rod 50 is slidable. This shifter rod 50 is mounted for lengthwise sliding movement in brackets 51, mounted on the frame of auxiliary motor 20, or, if desired, upon the fuselage 11. The wheel driving clutch in front housing 38 is provided with an independent operating lever 52, having an eye at its free end through which passes the shifter rod 50. The clutch controlling the screw 24 in the other housing 21 is also controllable by an independent lever 53, having an eye at its free end through which the shifter rod 50 passes. Mounted on shifter rod 50 for engagement by the arm 49, is the collar 54. Also mounted on shifter rod 50 for engagement with the front clutch lever 52, is a collar 55. Also mounted on shifter rod 50 for engagement with rear clutch lever 53, is a collar 56. It will be seen that as arm 49 moves backwardly with the draw-bars 35, it will engage the corresponding collar 54 on shifter rod 50 to move the shifter rod 50 lengthwise until collar 55 engages clutch lever 52 to throw out this clutch, whereby the drive of wheels 14 is automatically stopped. Also movement of this shifter rod 50 causes collar 56 to engage rear clutch lever 53 to throw out the clutch and stop the rotation of screw 24, whereby the wheel retracting action is also automatically stopped.

In operating the aircraft lift and driving mechanism of this inventon, in order to assist the craft in taking off from the ground, or other surface, auxiliary motor 20 is started in the usual way and the clutch in front housing 38 thrown into engagement by lever 37 to connect the driving mechanism of wheels to this auxiliary motor 20. The consequent rotation of wheels 14 drives the craft 10 along the ground independently of the air thrust of propeller 13 of motor 12. This drive of wheels 14 overcomes the inertia and rolling resistance of the heavy craft 10, which, accordingly, moves along the ground at an increasing rate of speed. The propeller motor 12 is then speeded up so that the craft is driven both by the propeller motor 12 and the auxiliary motor 20 to obtain the high rate of ground speed necessary to permit the craft to take off. The auxiliary motor 20 and its drive connection to traction wheels 14 may be arranged to drive the craft at a greater or lower speed than the normal ground speed procured by the propeller 13, depending upon requirements. Thus the auxiliary motor 20 may be employed to drive the craft along the ground before the propeller motor 12 is operated at high speed, simultaneously with the operation of the propeller motor, or other operating combinations. It is sufficient for the purposes of this invention, however, to point out that the auxiliary motor 20 and the drive connections to wheels 14 are to be operated in such a way that the full ground speed of the craft 10 may be obtained quickly and after a short run, so that the craft will take off in a small field or run-way regardless of its inertia or rolling resistance.

When sufficient ground speed has been attained so that the craft is ready to take off, the operator operates clutch lever 39 to throw the lifting mechanism into operation. This results in rotation of screw 24 and the consequent movement of cross-head 26 in a rearward direction upon the screw 24. This movement of cross-head 26 causes the draw-bars 35 to swing the pantograph mounting of traction wheels 14 from the normal forward or raised position to the lowermost position shown in phantom in Figure 1, whereby the nose of the craft is raised and its lifting surfaces projected into the air at a greater angle of pitch so that the lifting force is considerably augmented. This action is accompanied by the usual operation of the ailerons, elevators and the like by the pilot or other operator. The craft is, accordingly, projected into the air at once when taking off and the air stream catches it, and the aileron and elevator action accompanying the operation of the lifting mechanism, cause the craft to take off at once without bouncing or skipping along the ground as so frequently happens with heavily loaded craft. As the cross-head 26 moves rearwardly it is engaged by buffer spring 28, which relieves the momentum of movement of this heavy lifting mechanism, and as the cross-head 26 passes off the end of the screw 24 the pawl 30 engages the teeth 29 on the cross-head 26 and holds it in retracted position. When the cross-head reaches or approaches this rearmost position, arm 49 on draw-bars 35 engages collar 54 on shifting rod 50 to move the latter rearwardly until collar 55 engages clutch lever 52 to disengage the clutch and stop the wheel driving mechanism. Collar 56 also engages clutch lever 53 to disengage the corresponding clutch and stop the operation of the lifting mechanism at approximately the time that the pawl 30 engages the teeth 29 on the cross-head 26 to hold it in retracted position. This is done automatically after the craft has taken off, inasmuch as the wheel driving mechanism and the lifting mechanism have performed their functions and are no longer necessary. By proper arrangement of the collars 54, 55 and 56, lengthwise of shifter rod 50, this automatic disconnecting mechanism may be placed into action at any desired time. For example, it may be found desirable to shut off the driving mechanism for wheels 14 first, and the lifting mechanism next, or vice versa.

It will be seen that the lifting mechanism remains in the extended position shown in phantom in Figure 1 while the craft is flying and it preferably remains in this position while the craft is landing, although automatic means for releasing pawl 30 may be provided so that the pilot or other operator may reverse the rotation of screw 24 by shifting reverse lever 59 and restore the wheels to their forward position, as illustrated in Figure 1, before the craft lands. However, under ordinary conditions, the craft may be lowered after landing by contracting the lifting mechanism. This is done by releasing pawl 30 manually, whereby the pressure of spring 28 tends to force cross-head 26 into engagement with the end of the screw 24 so that when motor 20 is connected to the screw 24 by means of the clutch, the screw 24 and collar 26 immediately mesh. The motor 20 is then driven until the craft is lowered into the position shown in Figure 1, the weight of the craft in swinging about wheels 14 as pivots aiding this lowering action by increasing displacement of the center of gravity of the craft behind the wheels 14.

As mentioned, the pawl 30 may be released manually by means of lever 32. This pawl may also be released automatically at the time the drive of auxiliary motor 20 is thrown into reverse by lever 59 for the purpose of returning the lifting mechanism to its normal contracted position. Connecting the reversing mechanism to the pawl release lever 32 is a cable 60, so that when reversing lever 59 in the cockpit is operated the pawl 30 is automatically released whereby it is only necessary for the operator to manipulate clutch lever 37 to cause screw 24 to rotate in the reverse direction to return cross-head 26 and the lifting mechanism to their normal forward positions in the manner described.

This returning movement may also be stopped automatically by another arm 62 mounted on one of the draw-bars 37 and which is arranged to engage independent clutch lever 53 when the lifting mechanism has reached its normal forward position. This arrangement, accordingly, provides for the automatic stopping of the screw 22 so that no overrunning can result and manual control is unnecessary. To prevent the lifting and driving mechanism clutches from being jammed in open position by arms 49 or 62, these arms are made movable by releasing the set screws, or the like, which normally secure these arms to draw-bar 35, or by other suitable releasing means.

It will be seen that the new lift and drive device of this invention provides an extremely useful auxiliary for aiding the launching of aircraft, especially large and heavy craft, from relatively small fields or run-ways, which has not been possible heretofore because such craft had to be driven considerable distances before their inertia and rolling resistance was effectively overcome and their ground speed was sufficient to permit them to take off. Although the invention has been described in connection with an aeroplane supported on wheels, it is equally effective for hydro-aeroplanes in which the wheels 14 and/or 15 are replaced by pontoons and the driving connection to the front wheels is replaced by a water propelled drive. The invention is also useful in launching dirigible craft in the same manner. Also the term "ground" as used in the specification and claims comprehends any supporting surface for the craft whether it is a landing field, a ship's deck, a roof top, water, or the like.

I claim:

1. In a lift and drive device for aircraft, the combination of a motor mounted on the craft, mobile means for at least partially supporting the weight of the craft, and driving connections between the motor and said means for actuating the same to gradually change the vertical position of the craft relatively to the surface supporting the craft as the craft approaches taking off speed.

2. In a lift and drive device for aircraft, the combination of a source of power mounted on the craft, wheels for at least partially supporting the weight of the craft, and driving connections between the source of power and the wheels to rotate them and move them bodily relatively to the craft for moving the craft.

3. In a lift and drive device for aircraft, the combination of a motor mounted on the craft, mobile means for at least partially supporting the craft, driving connections between the means and the motor, and means for controlling said connections to actuate said mobile means relatively to the craft to gradually change the vertical position of the craft relatively to the surface supporting the craft as the craft approaches taking off speed.

4. In a lift and drive device for aircraft, the combination of a source of power mounted on the craft, extensible and contractible means between the craft and the ground for at least partially supporting the craft on the ground, and driving connections between said means and the source of power for gradually changing the vertical position of the craft relatively to the ground as the craft approaches taking off speed.

5. In a lift and drive device for aircraft, the combination of a source of power mounted on the craft, substantially vertically extensible means at least partially supporting the craft on the ground, and driving connections between said means and the source of power for extending said means to gradually elevate the craft above the ground as the craft approaches taking off speed.

6. In a lift and drive device for aircraft, the combination of a source of power mounted on the craft, substantially vertically extensible means at least partially supporting the craft on the ground, wheels mounted upon said means, connections between said power source for driving said wheels and extending said means.

7. In a lift and drive device for aircraft, the combination of a source of power mounted on the craft, a swinging undercarriage mounted upon the craft and at least partially supporting the craft on the ground, and connections between said undercarriage and the source of power for swinging the undercarriage relatively to the craft to vary the position of the craft relatively to the ground.

8. In a lift and drive device for aircraft, the combination of a source of power mounted on the craft, an extensible undercarriage mounted upon the craft and supporting at least part of the weight of the craft when it is on the ground, a nut and screw combination for extending said undercarriage, and connections between the source of power and said nut and screw combination for gradually increasing the elevation of said craft relatively to the ground by extending said undercarriage as the craft approaches taking-off speed.

9. In a lift and drive device for aircraft, the combination of a motor mounted on the craft, elements for at least partially supporting the craft, extensible mechanism on the craft for carrying said elements, and driving connections between said motor and the mechanism for gradually extending the same to gradually change the spaced relation between said elements and the craft as the craft approaches taking off speed, and means for controlling said connections.

10. In a lift and drive device for aircraft, the combination of a source of power mounted on the craft, elements for at least partially supporting the craft, extensible mechanism between the craft and mounting said elements, and driving connections between said source of power and the mechanism for extending the same to change the spaced relation between said elements and the craft, and means responsive to the movement of said elements for controlling said connections.

11. In a lift and drive device for aircraft, the combination of a source of power mounted on the craft, means for driving said craft along a surface, elements at least partially supporting the craft on said surface, mechanism between said elements and the craft for changing the spaced relation between said elements and the craft, driving connections between said source of power and said mechanism for extending the same to change the spaced relation between said elements and the craft, and driving connections between said source of power and said means for driving the craft.

12. In a lift and drive device for aircraft, the combination of a source of power mounted on the craft, means for driving said craft along a surface, elements at least partially supporting the craft on said surface, mechanism between said elements and the craft for changing the spaced relation between said elements and the craft, driving connections between said source of power and said mechanism for extending the same to change the spaced relation between said elements and the craft, driving connections between said source of power and said means for driving the craft, and means responsive to movement of said elements for controlling one of said connections.

13. In a lift and drive device for aircraft, the combination of a source of power mounted on the craft, means for driving said craft along a surface, elements at least partially supporting the craft on said surface, mechanism between said elements and the craft for changing the spaced relation between said elements and the craft, driving connections between said source of power and said mechanism for extending the same to change the spaced relation between said elements and the craft, driving connections between said source of power and said means for driving the craft, and means responsive to movement of said elements for controlling both of said connections.

14. In a lift and drive device for aircraft, the combination of a source of power mounted on the craft, means for at least partially supporting the craft, pendulous arms pivoted to the craft and mounting said means, a screw journalled on the craft, a nut thereon, connections between said arms and said nut, and driving connections between said screw and the source of power, whereby the screw is rotated to advance the screw and change the spaced relation between said means and the craft.

15. In a lift and drive device for aircraft, the combination of a source of power mounted on the craft, wheels at least partially supporting the craft, pendulous arms pivoted at one end on the craft and carrying said wheels at their other end, driving connections between said wheels and said source of power for driving the craft along a surface, nut and screw driving connections between said arms and said source of power for swinging the wheels bodily to vary their spacing relatively to the craft.

16. In a lift and drive device for aircraft, having a driving propeller and a motor therefor, an auxiliary motor mounted on said craft, elements for at least partially supporting the craft on a surface, extensible mechanism between the elements and the craft, driving connections between said auxiliary motor and said mechanism for extending the same to increase the spaced relation between said elements and the craft, means for driving the craft along the surface, and driving connections between said driving means and said auxiliary motor.

17. In a lift and drive device for aircraft, having a driving propeller and a motor therefor, an auxiliary motor mounted on said craft, elements for at least partially supporting the craft on a surface, a pantograph pivoted at one end to the craft and carrying said elements at the other end, a screw driven by said auxiliary motor, a cross-head threaded on said screw for movement therealong, draw-bars connecting said cross-head to said pantograph, and means for controlling the connections between said auxiliary motor and said screw for swinging said pantograph to vary the spaced relation between said elements and the craft.

18. In a launching device for aircraft, the combination of means for at least partially supporting the weight of the craft on a supporting surface, adjustable connections between the craft and said means permitting joint relative vertical and longitudinal movement between them, a source of power mounted on the craft, and driving connections between said source of power and said connections, whereby the craft is projected upwardly and forwardly relatively to the supporting means and the supporting surface.

19. In a launching device for aircraft, the combination of means for at least partially supporting the weight of the craft on a supporting surface, mechanism permitting joint downward and rearward movement of said means relatively to the craft, and a source of power for actuating said mechanism to project the craft upwardly and forwardly relatively to the supporting means and the supporting surface.

20. In a lift device for aircraft, the combination of a source of power mounted on the craft, a landing gear for supporting the craft on the ground, a part of said landing gear being extensible and contractible to change the elevation of the craft above the ground, and driving connections between said source of power and said part of the landing gear for gradually changing the elevation of the craft as it approaches taking-off speed before it leaves the ground.

21. In a lift and drive device for aircraft, the combination of a source of power mounted on the craft, a landing gear for at least partially supporting the weight of the craft on a supporting surface, said gear being movable longitudinally and vertically relatively to the craft, and driving connections between said source of power and said gear for changing the position of the craft relatively to the ground before it leaves the ground.

In testimony whereof I affix my signature.

WILLIAM A. FAIT.